(12) United States Patent
Sreenivas et al.

(10) Patent No.: US 11,515,794 B2
(45) Date of Patent: Nov. 29, 2022

(54) CURRENT ESTIMATION IN A POWER SUPPLY

(71) Applicant: Infineon Technologies Austria AG, Villach (AT)

(72) Inventors: Venkat Sreenivas, Winchester, MA (US); Timothy M. Starr, Salem, NH (US)

(73) Assignee: Infineon Technologies Austria AG, Villach (AT)

( * ) Notice: Subject to any disclaimer, the term of this patent is extended or adjusted under 35 U.S.C. 154(b) by 102 days.

(21) Appl. No.: 16/924,526

(22) Filed: Jul. 9, 2020

(65) Prior Publication Data

US 2022/0014102 A1   Jan. 13, 2022

(51) Int. Cl.
*H02M 3/158* (2006.01)
*H02M 1/00* (2006.01)

(52) U.S. Cl.
CPC ....... *H02M 3/1588* (2013.01); *H02M 1/0009* (2021.05)

(58) Field of Classification Search
CPC ..... H02M 3/158; H02M 3/156; H02M 1/0009
See application file for complete search history.

(56) References Cited

U.S. PATENT DOCUMENTS

| | | | | |
|---|---|---|---|---|
| 9,219,414 B2* | 12/2015 | Shao | ...................... | H02M 3/158 |
| 9,537,386 B2* | 1/2017 | Herfurth | ............. | H02M 1/4208 |
| 9,608,518 B2* | 3/2017 | Yin | ........................ | H02M 3/285 |
| 9,882,476 B2* | 1/2018 | Babazadeh | ......... | H02M 3/1588 |
| 9,941,795 B1* | 4/2018 | Mayega | ............... | G01R 19/003 |
| 10,033,282 B2* | 7/2018 | Babazadeh | ........... | H02M 3/158 |
| 10,433,378 B1* | 10/2019 | Del Croce | ........... | H05B 45/375 |
| 10,892,683 B2* | 1/2021 | Nam | ..................... | H02M 3/157 |
| 2004/0178783 A1* | 9/2004 | Uematsu | ............... | H02M 3/157 323/282 |
| 2005/0207181 A1* | 9/2005 | Halberstadt | .......... | H02M 3/156 363/16 |
| 2010/0131219 A1* | 5/2010 | Kenly | ............... | G01R 19/0092 702/64 |

(Continued)

OTHER PUBLICATIONS

European Extended Search Report, EP 21184690.2, dated Nov. 29, 2021, pp. 1-7.

*Primary Examiner* — Gustavo A Rosario-Benitez
(74) *Attorney, Agent, or Firm* — Armis IP Law, LLC

(57) ABSTRACT

An apparatus includes a current emulator and a controller. The emulator receives a reference output current value representing a measured average amount of output current delivered by the voltage converter to the load for a first portion of a power delivery cycle during which high side switch circuitry and low side switch circuitry in the voltage converter are activated at different times to produce the output current. The power delivery cycle includes a second portion during which the high side switch circuitry and the low side switch circuitry of the voltage converter are deactivated. Via trial and error, the emulator derives an average output current value delivered to the load for the power delivery cycle based on the reference output current value and repeated adjustments to the estimation of the average output current. The controller controls operation of the voltage converter based on the derived average output current value.

31 Claims, 10 Drawing Sheets

(56) References Cited

U.S. PATENT DOCUMENTS

| | | | |
|---|---|---|---|
| 2013/0294118 A1* | 11/2013 | So | H02M 3/33507 363/21.16 |
| 2014/0232360 A1* | 8/2014 | Dally | H02M 3/1588 323/266 |
| 2014/0285169 A1 | 9/2014 | Zhang et al. | |
| 2015/0077074 A1* | 3/2015 | Rahimi | H02M 3/1588 323/271 |
| 2016/0036326 A1* | 2/2016 | Sreenivas | H02M 3/158 323/271 |
| 2016/0141957 A1 | 5/2016 | Ozawa | |
| 2017/0062110 A1* | 3/2017 | Matsumoto | F02D 41/1408 |
| 2017/0222560 A1* | 8/2017 | Babazadeh | H02M 3/158 |
| 2018/0123441 A1* | 5/2018 | Yanai | F16H 61/0006 |

\* cited by examiner

CURRENT ESTIMATION IN A POWER SUPPLY

BACKGROUND

One type of conventional voltage converter is a buck converter. In general, to maintain an output voltage within a desired range, the buck converter compares the magnitude of a generated output voltage to a setpoint reference voltage to control respective switch circuitry (such as a control switch and synchronous switch) in the voltage converter. For example, based on the comparison, and generated error voltage, the buck converter adjusts a pulse width modulation and/or a switching frequency of software control signals to regulate the output voltage.

In some voltage regulators, it is common to average the peak and valley output current values to produce a value indicating an average output current of the power supply. The resulting output is, for the most part, a reasonable representation of the current during a continuous conduction mode.

BRIEF DESCRIPTION

This disclosure includes the observation that conventional power supply monitoring and control techniques suffer from deficiencies.

For example, the average peak and valley current as previously discussed cannot be used to easily identify an amount of average delivered current during a discontinuous conduction mode of operating the respective power supply. In the discontinuous conduction mode (a.k.a., diode emulation mode or DEM), the actual current is a function of not just the average of the peak and valley, it is also based on the total switching period.

One way to calculate the actual current in DEM is to sample (at a high rate) the average current (ADC output) during active time and assume zero current during inactive time and low pass filter the resulting signal. In such an instance, a very low bandwidth filter is needed to suppress the ripple and extract the DC value. Hence, implementation of a filter is slow to produce an accurate output current value.

A faster way to obtain the actual output current of a voltage converter is to scale a respective ADC (analog-to-digital converter) output by (active time/total time). This involves a complex divider circuit and is thus expensive.

Embodiments herein include novel ways of determining an amount of current delivered to a load during a diode emulation mode.

More specifically, embodiments herein include a current emulator and a controller. The emulator initially receives a reference output current value representing a measured average amount of output current delivered by a voltage converter to a load for a first portion of a power delivery cycle during which high side switch circuitry and low side switch circuitry in the voltage converter are activated at different times to produce the output current. The power delivery cycle further includes a second portion during which the high side switch circuitry and the low side switch circuitry of the voltage converter are deactivated. Based on trial and error over multiple power delivery cycles, the emulator derives an average output current value delivered to the load for the power delivery cycle based on the reference output current value and, potentially, an adjusted estimation of the average output current if needed. The controller controls operation of the voltage converter based on the calculated average output current value produced by the emulator.

In accordance with further example embodiments, the reference output current value (such as M as described herein) represents a measured average amount of output current delivered by the voltage converter to the load during the first portion (such as less-than-all portion) of the power delivery cycle.

In still further example embodiments, producing the average output current value based on trial and error includes: i) repeatedly adjusting the estimated average output current over each of multiple power delivery cycles, and ii) determining an accuracy of the adjusted estimated average output current over each of the multiple power delivery cycles. In one embodiment, the emulator verifies an accuracy of the estimated average output current based on a remaining value stored in a buffer at an end of each power delivery cycle.

Note that the estimated output current value can be adjusted based on any suitable method. In one nonlimiting example embodiment, the emulator calculates the average output current value during a power delivery cycle based on first producing an estimated average output current; determining an accuracy of the estimated average output current; applying an adjustment to the estimated average output current in response to detecting that an error associated with the estimated average output current is greater than a threshold error value.

The emulator can be configured to calculate the average output current delivered by the voltage converter to the load in any suitable manner. For example, in one embodiment, calculation of the average output current value includes adjusting a count value stored in a buffer for a power delivery cycle in which the voltage converter produces the output current. More specifically, the emulator increments the count value stored in the buffer for each of multiple sample times during a first portion of the power delivery cycle during which the voltage converter generates the output current via activation of switches; the emulator decrements the count value in the buffer for a second portion of the power delivery cycle during which the voltage converter deactivates switches in the voltage converter.

In accordance with further example embodiments, the rate of incrementing the count value in the buffer (counter) during the first portion of the power delivery cycle is different than a rate of decrementing the count value during the second portion of the power delivery cycle. At the start of a power delivery cycle, the count value in the buffer starts at a reference value such as 0. During the first portion of the cycle, the emulator increments the count value based on the difference between the reference output current value and the estimated average output current. During the second portion of the cycle, the emulator decrements the count value based on the estimated average output current. At the end of the power delivery cycle, the emulator verifies an accuracy of the estimated average output current value based on a remaining value in the buffer. The closer the remaining count value in the buffer is to the reference value, the more accurate the estimated average output current is to the actual amount of average output current delivered to load.

As previously discussed, embodiments herein can include adjusting the estimated average output current for each of multiple power delivery cycles until the emulator converges on an estimated average output current that is accurate within a threshold value.

Embodiments herein are useful over conventional techniques. For example, the emulator and corresponding method as described herein can be fabricated via few gates and only adders (no multiplication or division), as well as removing any need for a large RC filter in the analog domain. Via iterations, the emulator quickly produces an accurate estimation of output current in only a few PWM cycles after entering diode emulation mode. The accuracy of producing the emulated value as described herein complies with SVID (Serial Voltage IDentifier) current accuracy requirements at all tested currents and frequencies (such as up to or over 2 MHz) in simulation. The emulator as described herein saves on power. For example, the emulator does not need to run at the maximum frequency on chip to provide accurate current estimations, even when switching at maximum output frequency, allowing for some power savings and preventing unnecessary clock signal routing.

These and other more specific embodiments are disclosed in more detail below.

Note that although embodiments as discussed herein are applicable to voltage converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: receive a reference output current value representing an amount of output current delivered by a voltage converter to a load; derive an average output current value based on the reference output current value and an estimated average output current, the derived average output current value representing an average output current delivered to the load; and control the voltage converter based on the derived average output current value.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
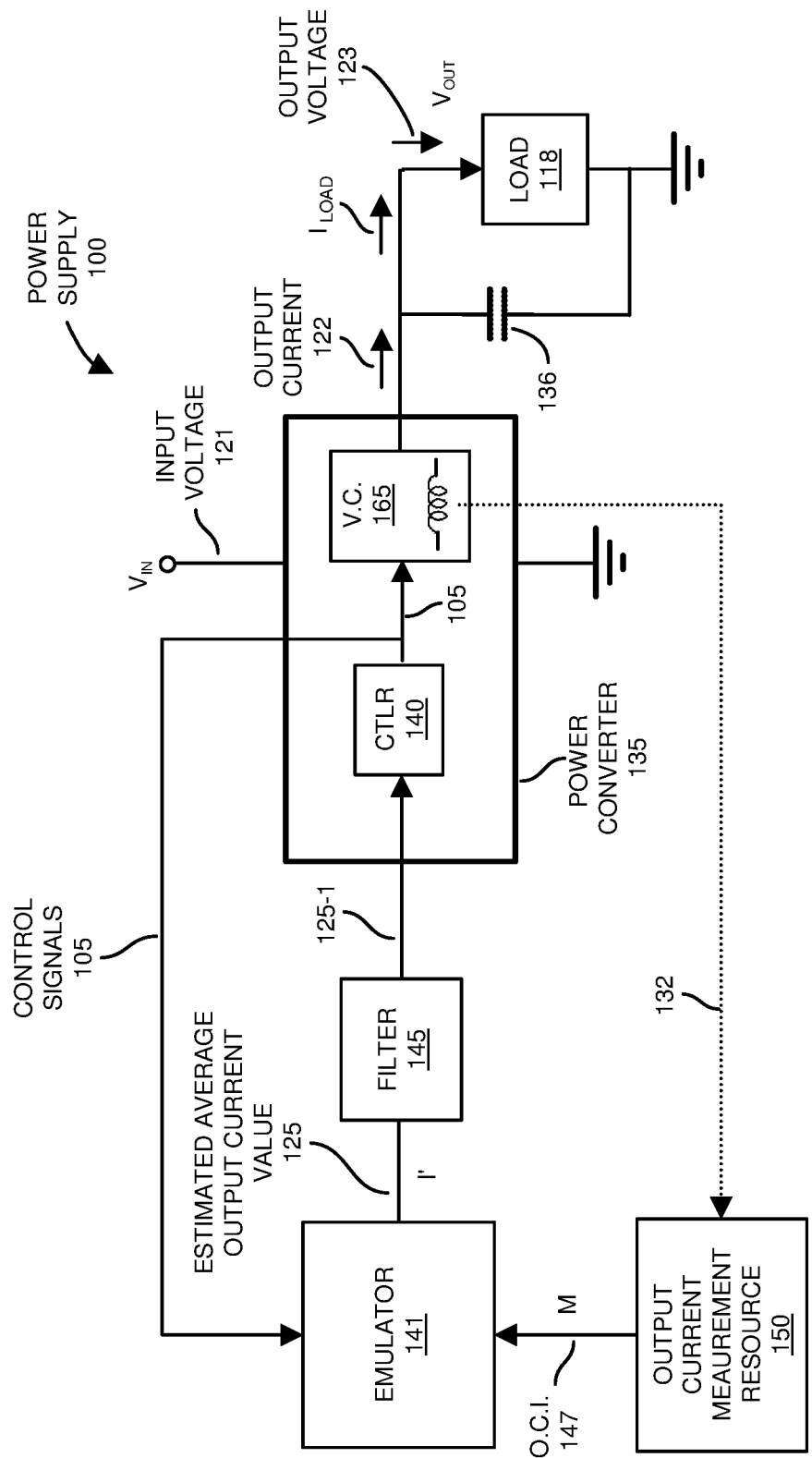
FIG. 1 is an example general diagram of a power supply supporting current emulation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a current emulator and a controller. The emulator initially receives a reference output current value representing a measured average amount of output current delivered by a voltage converter to a load for a first portion of a power delivery cycle during which high side switch circuitry and low side switch circuitry in the voltage converter are activated at different times to produce the output current. When in a diode emulation mode, the power delivery cycle includes a second portion during which the high side switch circuitry and the low side switch circuitry of the voltage converter are deactivated. Via trial and error, the emulator derives an average output current value delivered to the load for the power delivery cycle based on the reference output current value and an adjusted estimation of the average output current. The controller controls operation of the voltage converter based on the derived average output current value.

Now, more specifically, FIG. 1 is an example general diagram of a power supply supporting output current emulation according to embodiments herein.

In this example embodiment, the power supply 100 includes output current measurement resource 150, emulator 141, filter 145, and power converter 135. Power converter 135 includes controller 140 and voltage converter 165.

Controller 140 controls operation of the voltage converter 165 and generation of the output voltage 123 based on control signals 105. In one non-limiting example embodiment, the voltage converter 165 is a DC-to-DC voltage converter that converts the input voltage 121 such as a first DC voltage into the output voltage 123 such as a second DC voltage.

As further shown, output current measurement resource 150 receives one or more signals 132 (such as feedback signals associated with the voltage converter 165). Via the one or more signals 132, as its name suggests, the output current measurement resource 150 physically measures (such as through a respective inductor) the output current 122 supplied by the output voltage 123 to the capacitor 136 and the load 118. The amount of current (such as Iload) consumed by the load 118 varies over time.

In one embodiment, based on the signals 132, the output current measurement resource 150 produces output current information 147 indicating a magnitude of the output current 122. In one embodiment, the output current measurement resource 150 is or includes one or more analog-to-digital converters to measure a voltage across or associated with a respective inductor in the voltage converter 165 to determine the output current 122.

In accordance with further embodiments, as further discussed herein, the output current information 147 (a.k.a., value M) produced by the output current measurement resource 150 specifies an average amount of output current 122 delivered by the power converter 135 to the load 118 during a portion of a power delivery cycle.

As further shown, the emulator 141 receives the output current information 147 as well as control signals 105 (which are used to control switches in the voltage converter 165 and generation of the output voltage 123) to generate the average output current value 125 (such as estimated current I').

Filter 145 receives the (estimated) average output current value 125 derived from emulation and filters it to produce the filtered output current value 125-1 fed to the controller 140. The controller 140 uses the filtered average output current value 125-1 to control generation of the output voltage 123 and corresponding output current 122 to power load.

Figure 2:
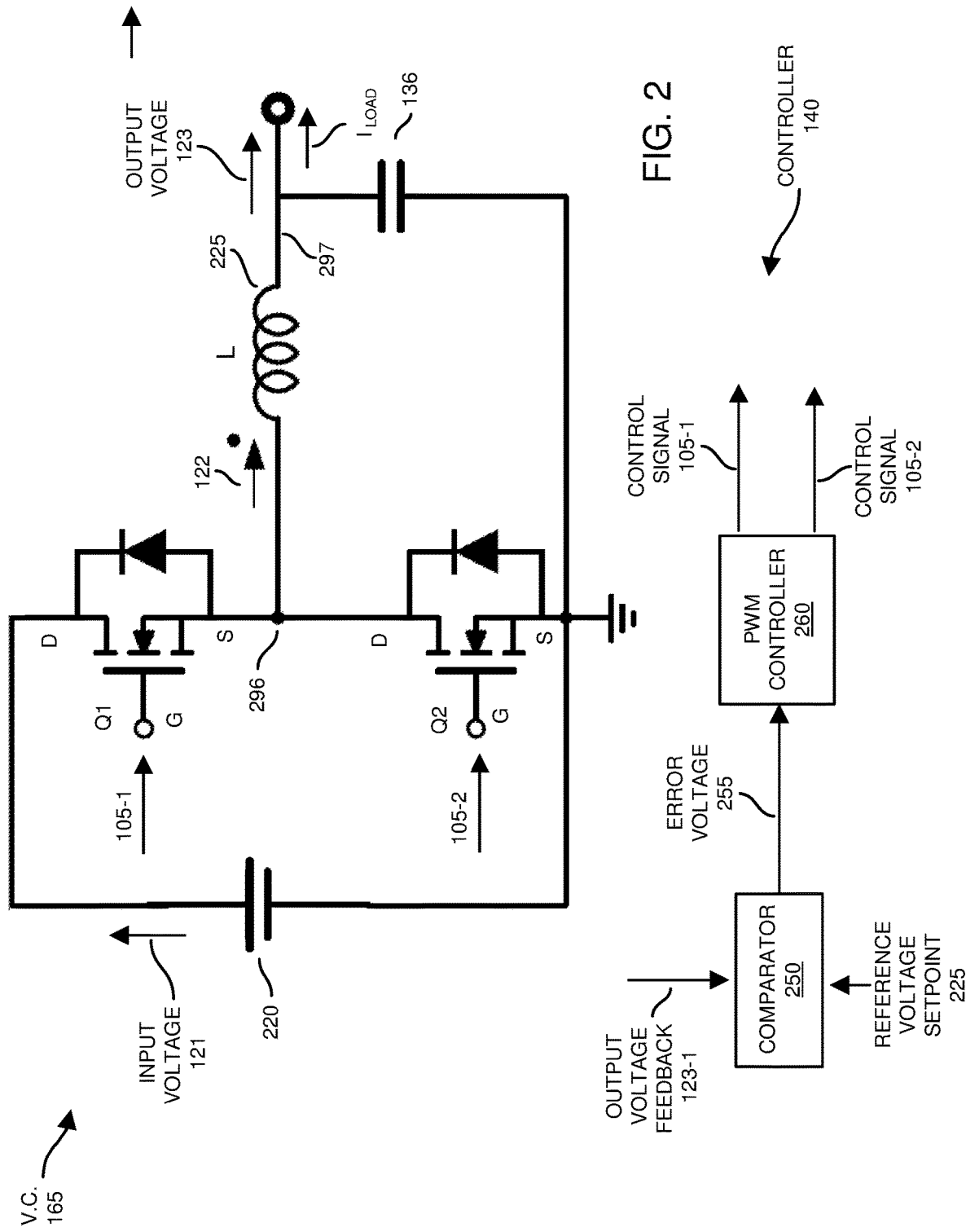
FIG. 2 is an example diagram illustrating a voltage converter according to embodiments herein.

FIG. 2 is an example diagram illustrating a voltage converter according to embodiments herein.

In this non-limiting example embodiment, the voltage converter 165 is configured as a buck converter including voltage source 220 (providing input voltage 121 such as a first DC voltage), switch Q1, switch Q2, inductor 225, and output capacitor 136.

Although the voltage converter 165 in FIG. 2 is a buck converter configuration, note again that the voltage converter 165 can be instantiated as any suitable type of voltage converter and include any number of phases, providing regulation as described herein.

As further shown, the switch Q1 (such as high side switch or control switch circuitry) of voltage converter 165 is connected in series with switch Q2 (such as low side switch or synchronous switch circuitry) between the input voltage 121 and corresponding ground reference. The voltage converter 165 further includes inductor 225 extending from the node 296 to a common node 297 associated with the output capacitor 136 and dynamic load 118.

Via switching of the switches Q1 and Q2 based on respective control signals 105-1 (applied to gate G of switch Q1) and 105-2 (applied to gate G of switch Q2), node 296 coupling the source (S) node of switch Q1 and the drain (D) node of switch Q2 provides output current 122 through the inductor 225, resulting in generation of the output voltage 123 and output current 122 storing energy on capacitor 136 and powering the load 118. During conditions in which the current 122 through the inductor 225 is zero in a power delivery cycle, the capacitor 136 provides the current Iload to the load 118.

In one embodiment, the controller 140 controls switching of the switches Q1 and Q2 based on one or more feedback parameters. For example, the controller 140 can be configured to receive output voltage feedback signal 123-1 derived from the output voltage 123 supplied to power the load 118 as previously discussed in FIG. 1. The output voltage feedback signal 123-1 can be the output voltage 123 itself or a proportional derivative thereof.

Referring again to FIG. 2, via the comparator 250, the controller 140 compares the output voltage feedback signal 123-1 (such as output voltage 123 itself or derivative, or proportional signal) to the reference voltage setpoint 225. As previously discussed, the reference voltage setpoint 225 is a desired setpoint in which to control a magnitude of the output voltage 123 during load-line regulation or other suitable mode implemented by the power supply 100. In one embodiment, during load-line regulation, a magnitude of the reference voltage setpoint 225 can be configured to vary depending on the magnitude of the output current 122.

Based on comparison of the output voltage feedback signal 123-1 and the reference voltage setpoint 225, the comparator 250 produces a respective error voltage 255 as a difference between the output voltage feedback signal 123-1 and the reference voltage 225. A magnitude of the error voltage 255 generated by the comparator 250 varies depending upon the degree to which the magnitude of the output voltage 123 is in or out of regulation (with respect to the reference voltage setpoint 225).

As further shown, the PWM (Pulse Width Modulation) controller 260 of the controller 140 controls operation of switching the switches Q1 and Q2 based upon the magnitude of the error voltage 255. For example, if the error voltage 255 indicates that the output voltage 123 (of the voltage converter 165) becomes less than a magnitude of the reference voltage 225, the PWM controller 260 increases a duty cycle and/or frequency of activating the high side switch Q1 (thus decreasing a duty cycle of activating the low-side switch Q2) in a respective switch control cycle.

Conversely, if the error voltage 255 indicates that the output voltage 123 (of the voltage converter 165) becomes greater than a magnitude of the reference voltage 225, the PWM controller 260 decreases a duty cycle and/or frequency of activating the high side switch Q1 (thus increasing a duty cycle of activating the low-side switch Q2) in a respective switching control cycle.

As is known in the art, the controller 140 controls each of the switches Q1 and Q2 ON and OFF at different times to prevent short-circuiting of the input voltage 121 to the ground reference voltage. For example, when the switch Q1 is activated to an ON state, the switch Q2 is deactivated to an OFF state. Conversely, when the switch Q1 is deactivated to an OFF state, the switch Q2 is activated to an OFF state.

Note that the controller 140 implements a dead time between ON-OFF and OFF-ON state transitions to prevent shorting of the input voltage 121 to the ground reference.

Via variations in the pulse with modulation of controlling the respective switches Q1 and Q2, the controller 140 controls generation of the output voltage 123 such that the output voltage 123 remains within a desired voltage range with respect to the reference voltage setpoint 225.

As further discussed herein, the voltage converter 165 can be operated in a so-called continuous conduction mode (a.k.a., CCM) or a diode emulation mode (a.k.a., DEM).

As is known, in the continuous conduction mode, either the switch Q1 or switch Q2 is activated during a respective power delivery cycle. There is very little dead time in which switch Q1 and Q2 are both in the off state.

Conversely, during the diode emulation mode, each of the switches Q1 and Q2 are activated during the respective power delivery cycle. However in this latter mode, there is a substantial amount of time in a power delivery cycle in which switch Q1 and Q2 are both in the OFF state because the load 118 consumes so little power.

Figure 3:
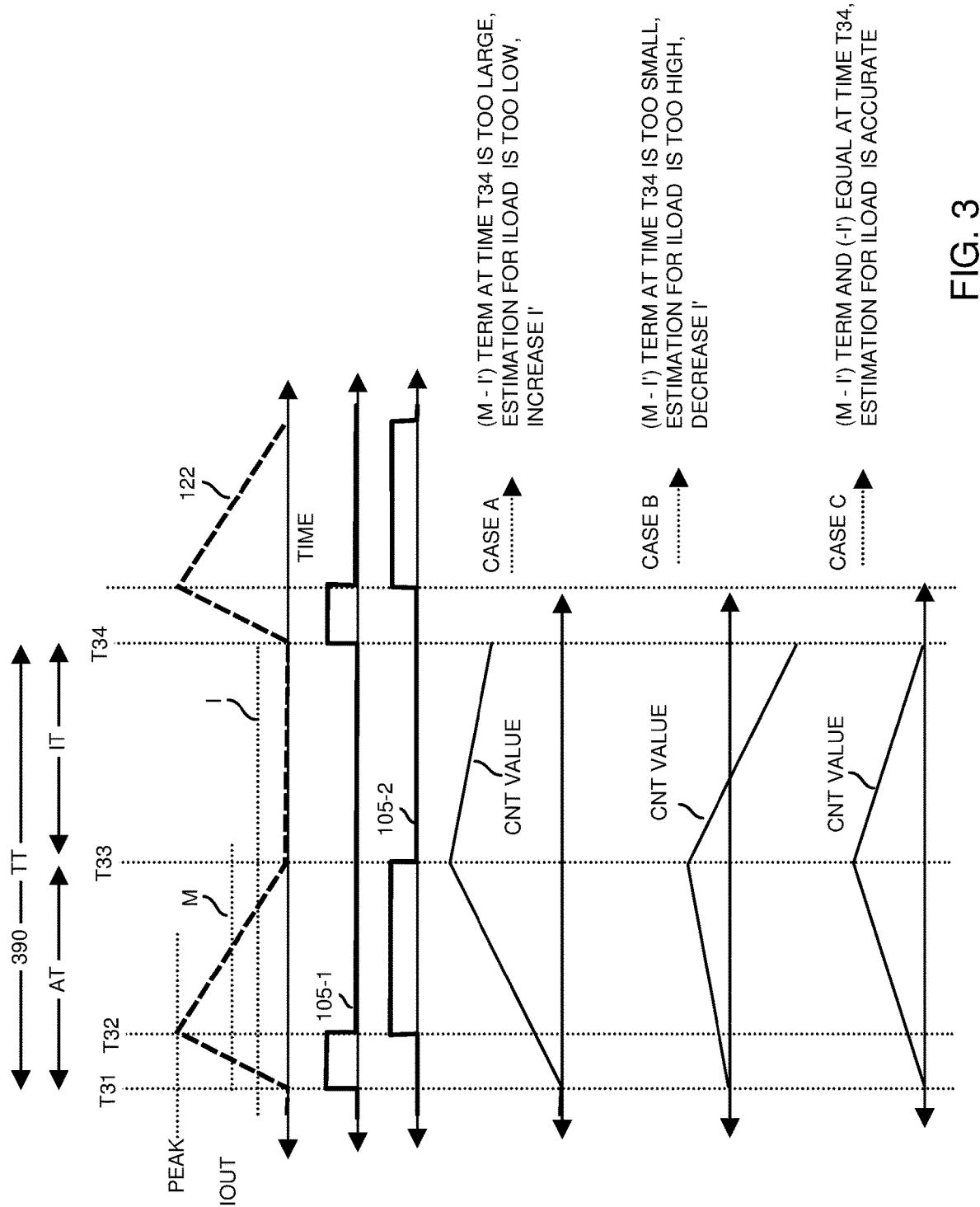
FIG. 3 is an example diagram illustrating emulation based on trial and error according to embodiments herein.

FIG. 3 is an example diagram illustrating emulation based on trial and error according to embodiments herein.

As shown in FIG. 3, the controller 140 generates the control signal 105-1 to activate high side switch circuitry Q1 between time T31 and time T32 to an ON state. The controller 140 further generates the control signal 105-2 between time T32 and time T33 to activate the low side switch circuitry Q2 to an ON state. Between time T33 and time T34, the controller 140 deactivates both high side switch circuitry Q1 and low side switch circuitry Q2 to an OFF state.

The value AT (Active Time of high side switch circuitry Q1 and low side switch circuitry Q2) represents the time between T31 and T33. The value IT represents (Inactive Time of high side switch circuitry Q1 and low side switch circuitry Q2) represents the time between T31 and T33. TT (Total Time) represents the time between T31 and T34, which includes multiple sample times.

As further shown, the value M generated by the output current measurement resource 150 represents an average amount of current through the inductor 225 between time T31 and T33. In one embodiment, the output current measurement resource 150 determines the average current M based on the detected PEAK current at time T32 and dividing it by 2. More specifically, in one embodiment, M=PEAK/2.

In one embodiment, the average current through the inductor 225 between time T31 and time T34 is initially unknown. As further discussed below in FIG. 4, the emulator 141 initially guesses as to the average amount of current I' (such as between 0 and M) during the power delivery cycle 390. The emulator 141 then determines an accuracy of the guess of the average amount of current through the inductor 225 between time T31 and time T34 based upon incrementing the count value between time T31 and time T33 (such as by M−I') for each sample time and decrementing the count value between time T33 and time T34 (such as by I') for each sample.

As shown by case A in this example, if the remaining count value associated with the emulator 141 is substantially greater than 0 at time T34 representing the end of the power delivery cycle 390, this indicates that the estimation for the average current through the inductor 225 for the power delivery cycle 390 is too low and that the value I' needs to be increased.

As shown by case B, if the remaining count value associated with the emulator 141 is substantially less than 0 at time T34 representing the end of the power delivery cycle 390, this indicates that the estimation for the average current through the inductor 225 for the power delivery cycle 390 high and that the value I' needs to be decreased.

As shown by case C, if the remaining count value is substantially equal to 0 at time T34, this indicates that the estimation for the average current through the inductor 225 for the power delivery cycle 390 is substantially correct.

Figure 4:
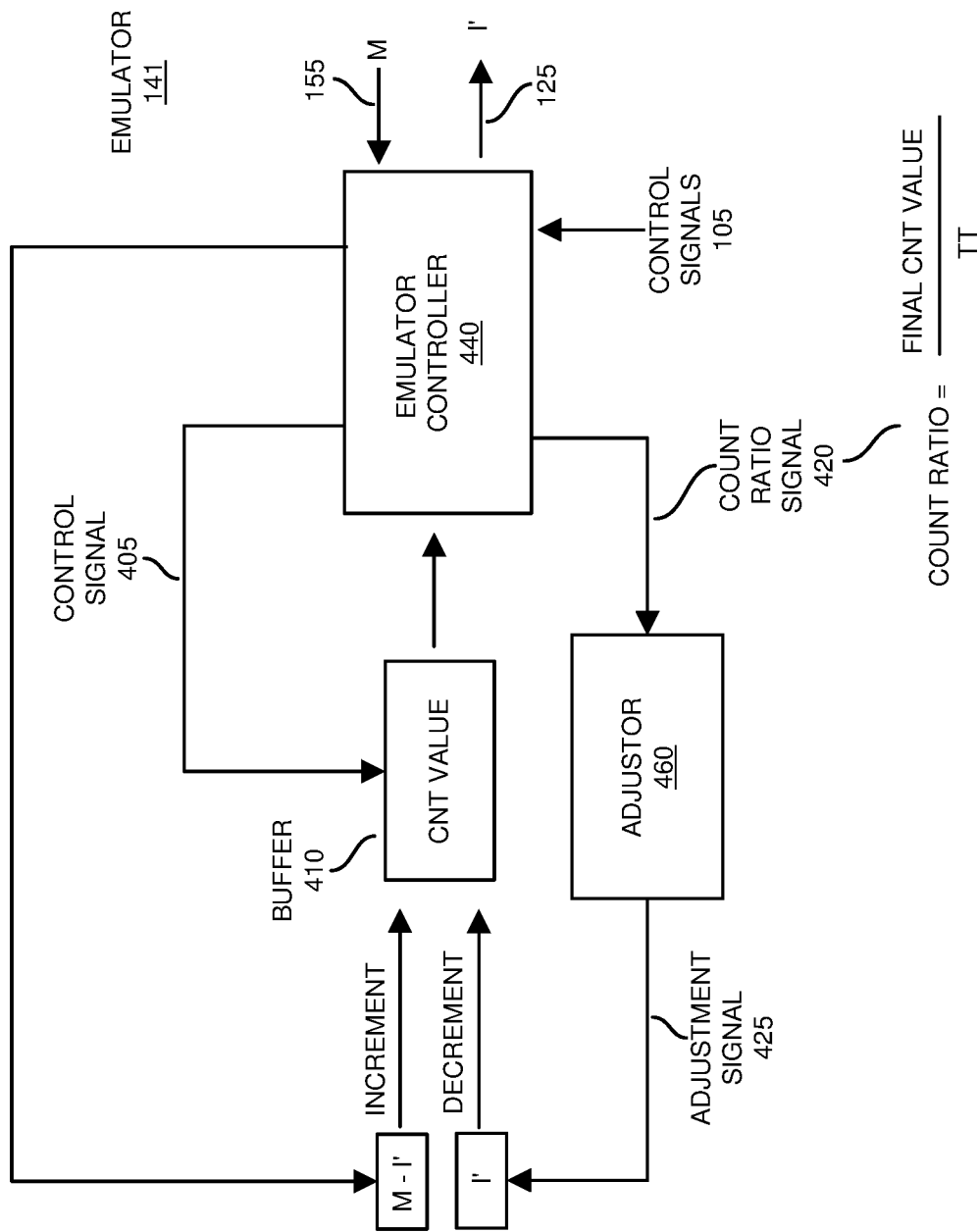
FIG. 4 is an example diagram illustrating a flowchart of producing an emulated output current value according to embodiments herein.

The method of counting is more particularly shown in FIG. 4.

FIG. 4 is an example diagram illustrating an emulator according to embodiments herein.

In this example embodiment, the emulator 141 includes a simple set of circuitry such as buffer 410 (such as counter), emulation controller 440, and adjustor 460 (such as adder).

The emulator 141 initially receives a reference output current value M representing a measured average amount of output current delivered by the voltage converter 165 to the load for a first portion (such as AT between T31 and T33 in FIG. 3) of a power delivery cycle 390 during which high side switch circuitry Q1 and low side switch circuitry Q2 in the voltage converter 165 are activated at different times to produce the output current 122.

The power delivery cycle 390 further includes a second portion (such as IT between T33 and T34 in FIG. 3) during which the high side switch circuitry Q1 and the low side switch circuitry Q2 of the voltage converter 165 are deactivated (OFF). Based on trial and error over multiple power delivery cycles, the emulator 141 derives an average output current value 125 (such as I') delivered to the load 118 for the respective power delivery cycle based on the reference output current value M and one or more adjusted estimations of the average output current 125 over multiple power delivery cycles.

As previously discussed in FIG. 1, the controller 140 controls operation of the voltage converter 165 based on the calculated average output current value 125 or filtered average output current value 125-1 produced by the emulator 141.

In one embodiment, as previously discussed, the reference output current value M represents a measured average amount of output current delivered by the voltage converter 165 to the load 118 and capacitor 136 during the first portion (such as less-than-all portion or time AT) of the power delivery cycle.

Note that, in one embodiment, producing the average output current value 125 based on trial and error includes: i) repeatedly adjusting the estimated average output current 125 over each of multiple power delivery cycles, and ii) determining an accuracy of the adjusted estimated average output current 125 over each of the multiple power delivery cycles. In further example embodiments, the emulator 141 verifies an accuracy of the estimated average output current 125 based on a remaining value stored in a buffer 410 at an end of a respective power delivery cycle.

More specifically, in one embodiment, the emulation controller 440 resets the count value in buffer 410 at the beginning (such as time T31) of the power delivery cycle. The emulator 141 produces the increment count value to be a difference between the output reference current value M and an estimated current I' or a value M−I'. The emulator 141 produces the decrement count value to be the estimated current I'.

In one embodiment, the rate of incrementing the count value in buffer 410 during the first portion of the power delivery cycle (such as between time T31 and time T33) is different than a rate of decrementing the count value in the buffer 410 during the second portion of the power delivery cycle (such as between time T33 and T34).

At the start of a respective power delivery cycle, the count value in the buffer 410 starts at a reference value such as 0. During the first portion of the cycle between time T31 and time T33, the emulator 141 increments the count value stored in the buffer 410 for each of multiple sample times based on the increment value M−I'. In one embodiment, the emulation controller 440 determines the first portion of the cycle between time T31 and time T33 based upon the control signals 105. In other words, as previously discussed, the emulator 141 determines the first portion (AT) of the power delivery cycle 390 based on control signals 105 indicating when the high side switch Q1 and the low side switch Q2 are in an ON state.

During the second portion of the cycle starting at time T33, the emulator 141 decrements the count value stored in buffer 410 for each of multiple sample times based on the estimated average output current (I').

In one embodiment, the emulation controller 440 determines the second portion of the cycle between time T33 and time T34 based upon the control signals 105. In other words, as previously discussed, the emulator 141 determines the second portion (IT) of the power delivery cycle 390 based on control signals 105 indicating when the high side switch Q1 and the low side switch Q2 are both OFF state.

At the end of the power delivery cycle 390, the emulator 141 verifies an accuracy of the estimated average output current value 125 based on a remaining count value in the buffer 410 at time T34. For example, the closer the remaining count value in the buffer 410 is to the reference (start) value such as 0 counts at time T34, the more accurate the estimated average output current 125 is to the actual amount of average output current delivered to load for the entire power delivery cycle 390.

As previously discussed, the initial estimate of the output current value 125 for the respective power delivery cycle may be inaccurate. Embodiments herein include adjusting the estimated average output current 125 for each of multiple power delivery cycles until the emulator 141 converges on an estimated average output current 125 that is accurate above a threshold value (such as ⅛ ampere or other suitable value).

For example, in one embodiment, at the end of a respective power delivery cycle, the emulation controller 440 produces a count ratio signal 420 indicating a ratio of the final count value stored in buffer 410 for the power delivery cycle divided by the total time TT. Based on a magnitude of the count ratio signal 420, the adjustor 460 produces adjustment signal 425 to modify the value I' for testing of same in a subsequent power delivery cycle.

In a similar manner as previously discussed, if the estimated average output current value I' is determined to be inaccurate, the emulator 141 adjusts the value I'. Using the newly adjusted value of I', emulator 141 repeats the above method of incrementing and decrementing the respective count value in buffer 410 to determine if the newly adjusted estimated average output current value I' is accurate.

Accordingly, embodiments herein include, via the emulator 141, producing an estimated average output current I'; determining an accuracy of the estimated average output current I'; applying an adjustment to the estimated average output current I' in response to detecting that an error associated with the estimated average output current I' is greater than a threshold error value. In this manner, as previously discussed, the iterative process of verifying and adjusting the estimated average output current value as needed results in convergence of the estimated average output current I' to the actual current supplied by the power converter 135 to the load 118 during a respective power delivery cycle during which the voltage converter 165 is operated in a diode emulation mode.

Figure 5:
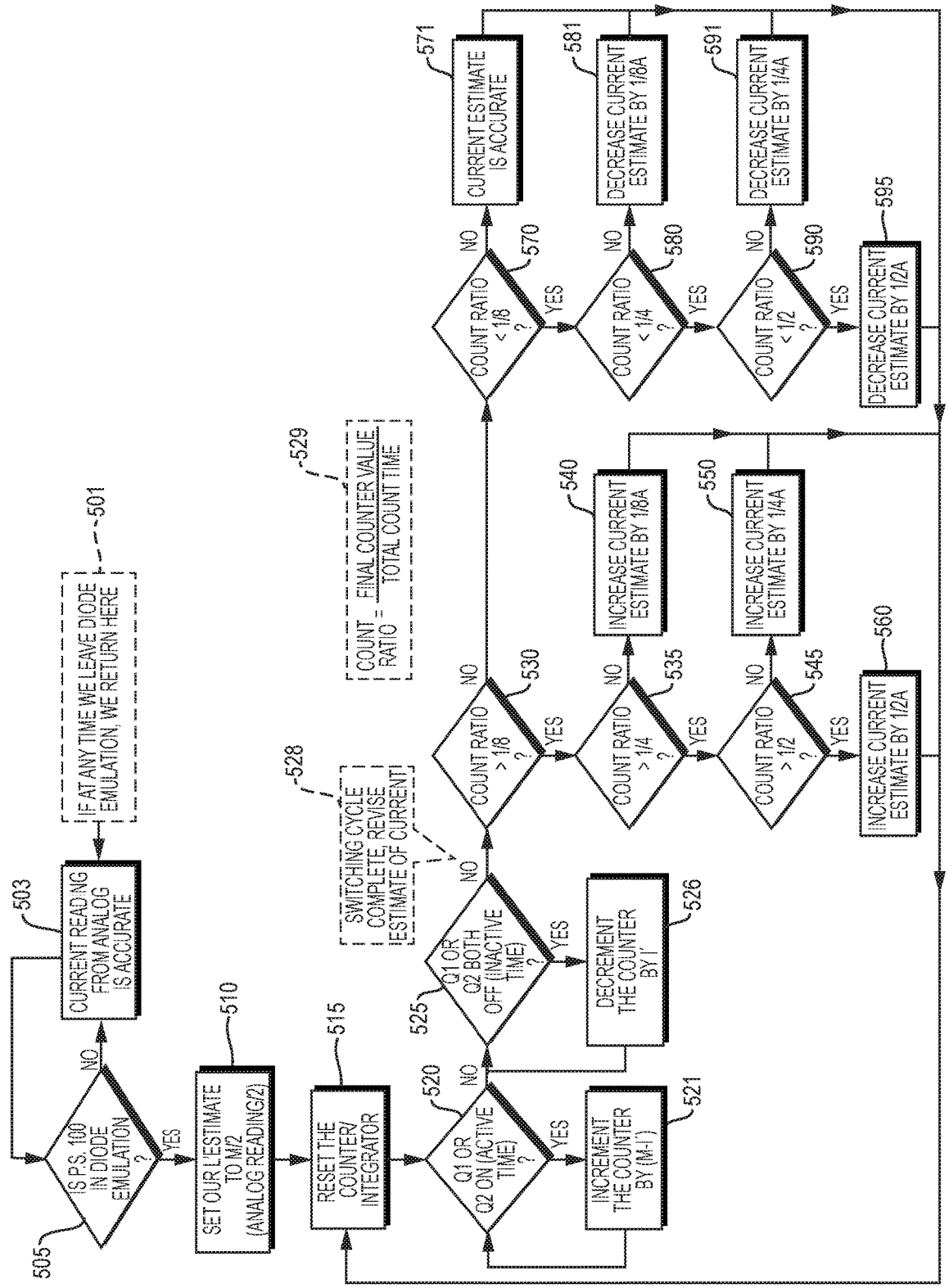
FIG. 5 is an example diagram illustrating an emulator according to embodiments herein.

FIG. 5 is an example diagram illustrating a flowchart of producing an emulated output current value according to embodiments herein.

In operation 501, the emulator 141 detects operation of the voltage converter 165 in the continuous conduction mode.

In operation 503, while in the continuous conduction mode, the emulator 141 uses the output current information 147 from the output current measurement resource 150 as a basis to derive the average output current value 125. As previously discussed, in the continuous conduction mode, the emulator 141 divides the PEAK detected current by 2 to produce an average output current value.

In operation 505, the emulator checks whether the power converter 135 operates in the diode emulation mode during which the off time of switches Q1 and Q2 is substantial. If the emulator 141 detects that the power converter 135 operates in the continuous conduction mode, the emulator 141 executes operation 503. Alternatively, if the emulator 141 detects that the power converter 135 operates in the diode emulation mode (discontinuous conduction mode), the emulator 141 executes the operation 510.

In operation 510, the emulator 141 sets the value I' to an initial value of M/2.

In operation 515, the emulator 141 resets the CNT VALUE stored in buffer 410.

In operation 520, the emulator 141 monitors whether switches Q1 or Q2 are activated to an on state. If so, the emulator 141 executes operation 521 during which the emulator 141 increments the count value stored in buffer by M-I' for each sample. Flow continues at operation 520. In response to detecting that the switches Q1 and Q2 or no longer both on in operation 520, flow continues at operation 525.

In operation 525, the emulator 141 checks whether both switches Q1 and Q2 are off. If so, in operation 526, the emulator 141 decrements the count value in buffer 410 by value I'. Flow continues back to operation 525. In response to detecting completion of a respective power delivery cycle (switching cycle) in operation 528, flow continues at operation 529.

In operation 529, the emulator 141 produces a ratio value (signal 420 of CNT VALUE/TT) equal to the final count value in buffer 410 (CNT VALUE) divided by the total count time (TT) associated with the power delivery cycle.

In operation 530, if the emulator 141 detects that the count ratio is less than ⅛, flow continues at operation 570. Alternatively, if the emulator 141 detects that the count ratio is greater than ⅛, flow continues at operation 535.

In operation 535, if the emulator 141 detects that the count ratio is less than ¼, flow continues at operation 540 in which the emulator 141 increases the current estimate value I' by ⅛ of an amp. Flow continues at operation 515. Alternatively, if the emulator 141 detects that the count ratio is greater than ¼ in operation 535, flow continues at operation 545.

In operation 545, if the emulator 141 detects that the count ratio is less than ½, flow continues at operation 560 in which the emulator 141 increases the current estimate value I' by ¼ of an amp. Flow continues at operation 515. Alternatively, if the emulator 141 detects that the count ratio is greater than ¼ in operation 535, flow continues at operation 560.

In operation 560, the emulator 141 increases the current estimate I' by ½ amps. Flow continues back to operation 515.

In operation 530, if the emulator 141 detects that the count ratio is less than ⅛, flow continues at operation 570.

In operation 570, if the emulator 141 detects that the count ratio is greater than negative ⅛, flow continues at operation 571 in which the emulator 141 determines that the current estimated value I' is accurate. In such an instance, flow continues at operation 515 again. Alternatively, if the emulator 141 detects that the count ratio is less than negative ⅛ in operation 570, flow continues at operation 580.

In operation 580, if the emulator 141 detects that the count ratio is greater than negative ¼, flow continues at operation 581 in which the emulator 141 reduces the current estimate by ⅛ of an amp. In such an instance, flow continues at operation 515 again. Alternatively, if the emulator 141 detects that the count ratio is less than negative ¼ in operation 580, flow continues at operation 590.

In operation 590, if the emulator 141 detects that the count ratio is greater than negative ½, flow continues at operation 591 in which the emulator 141 reduces the current estimate I' by ¼ of an amp. In such an instance, flow continues at operation 515 again. Alternatively, if the emulator 141 detects that the count ratio is less than negative ½ in operation 590, flow continues at operation 595.

In operation 595, the emulator 141 increases the current estimate I' by ½ amp. Flow continues back at operation 515.

In this manner, the emulator 141 repeatedly updates the estimated output current value 125 (I') on an as needed basis.

Figure 6:
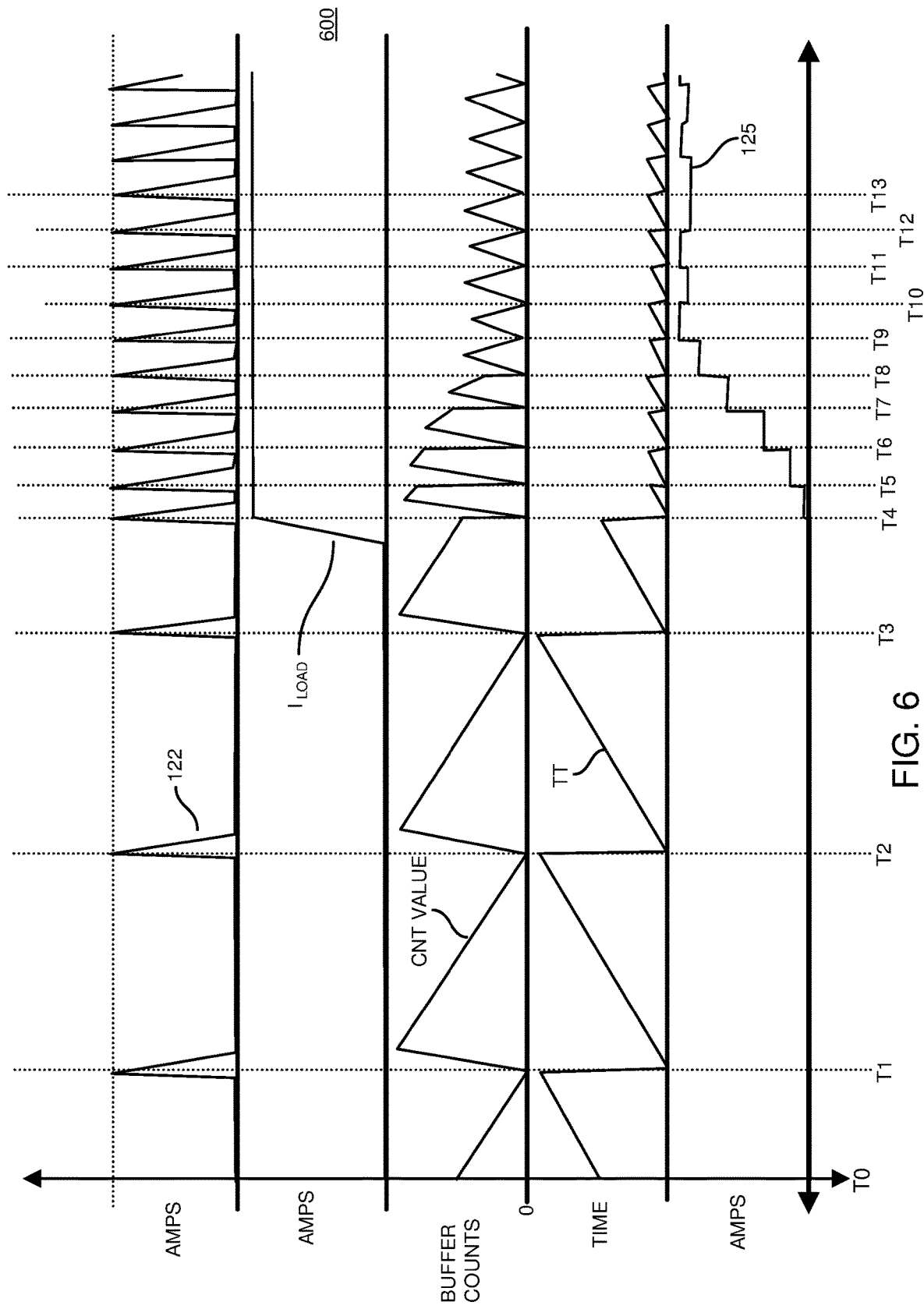
FIG. 6 is an example diagram illustrating a timing diagram of producing an emulated output current value over time according to embodiments herein.

FIG. 6 is an example diagram illustrating a timing diagram of producing an emulated output current value over time according to embodiments herein.

As shown, graph 600 illustrates operation of the power supply 100 in a diode emulation mode. In a manner as previously discussed, the emulator 141 produces the average output current value 125 (value I') to indicate the average amount of current supplied by the inductor 225 during each respective power delivery cycle (such as power delivery cycle between time T1 and time T2, power delivery cycle between time T2 and time T3, etc.).

At or around time T4, the load 118 consumes an additional amount of current causing the controller 140 to increase a respective frequency of activating the high side switch circuitry Q1 and low side switch circuitry Q2.

The increase in current consumption by the load 118 causes the prior average output current value 125 to be incorrect. In a manner as previously discussed, the emulator 141 adjusts the estimated average output current value 125 (I') over each of multiple cycles until the resulting count value at the end of a respective power delivery cycle is substantially 0 in the buffer 410.

In this particular instance, it takes the emulator 141 until time T9 to sufficiently adjust a magnitude of the estimated current I' over multiple power delivery cycles such that the estimated average output current value 125 matches the actual amount of current through the inductor 225 to the load 118. More specifically, it is noted that the estimated average output current value 125 at time T4, T5, T6, T7, and T8 are all incorrect because the resulting count value in buffer 410 is substantially different than 0. This is more particularly shown in FIG. 7.

Figure 7:
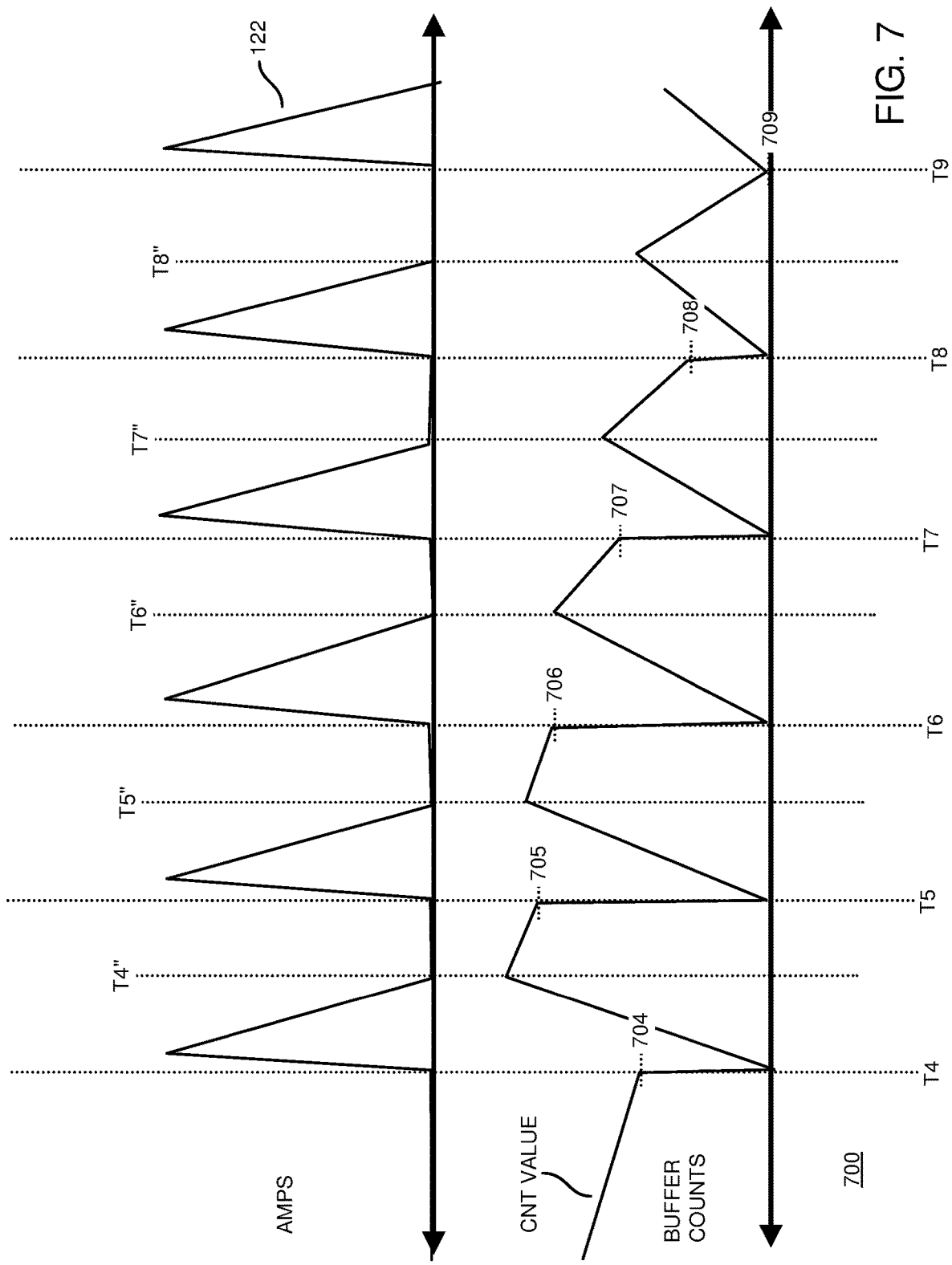
FIG. 7 is an example diagram illustrating generation of an emulated output current value using revised estimates for each of multiple power delivery cycles according to embodiments herein.

FIG. 7 is an example diagram illustrating generation of an emulated output current value using revised estimates for each of multiple power delivery cycles according to embodiments herein.

As previously discussed, the controller 140 sequentially activates the high side switch circuitry Q1 and low side switch circuitry Q2 between time T4 and time T4"; the controller 140 deactivates both the high side switch circuitry Q1 and low side switch circuitry Q2 between time T4" in time T5.

The controller 140 sequentially activates the high side switch circuitry Q1 and low side switch circuitry Q2 between time T5 and time T5"; the controller 140 deactivates both the high side switch circuitry Q1 and low side switch circuitry Q2 between time T5" in time T6.

The controller 140 sequentially activates the high side switch circuitry Q1 and low side switch circuitry Q2 between time T6 and time T6"; the controller 140 deactivates both the high side switch circuitry Q1 and low side switch circuitry Q2 between time T6" in time T7.

The controller 140 sequentially activates the high side switch circuitry Q1 and low side switch circuitry Q2 between time T7 and time T7"; the controller 140 deactivates both the high side switch circuitry Q1 and low side switch circuitry Q2 between time T7" in time T7.

The controller 140 sequentially activates the high side switch circuitry Q1 and low side switch circuitry Q2 between time T8 and time T8"; the controller 140 deactivates both the high side switch circuitry Q1 and low side switch circuitry Q2 between time T8" in time T9.

As previously discussed, the emulator 141 resets the count value in buffer 410 at the beginning of each power delivery cycle (such as power delivery cycle between time T4 and time T5, power delivery cycle between T5 and time T6, power delivery cycle between time T6 and time T7, and so on).

Since the count value stored in the buffer 410 is a nonzero count level 705 at time T5, the estimated average output current value 125 is incorrect. The emulator 141 implements an adjustment to value I' as previously discussed.

Since the count value stored in the buffer 410 is a nonzero count level 706 at time T6, the estimated average output current value 125 is incorrect. The emulator 141 implements an adjustment to value I' as previously discussed.

Since the count value stored in the buffer 410 is a nonzero count level 707 at time T7, the estimated average output current value 125 is incorrect. The emulator 141 implements an adjustment to value I' as previously discussed.

Since the count value stored in the buffer 410 is a nonzero count level 708 at time T8, the estimated average output current value 125 is incorrect. The emulator 141 implements an adjustment to value I' as previously discussed.

Since the count value stored in the buffer 410 is a substantially zero count level 709 at time T9, the estimated average output current value 125 is quite accurate.

Figure 8:
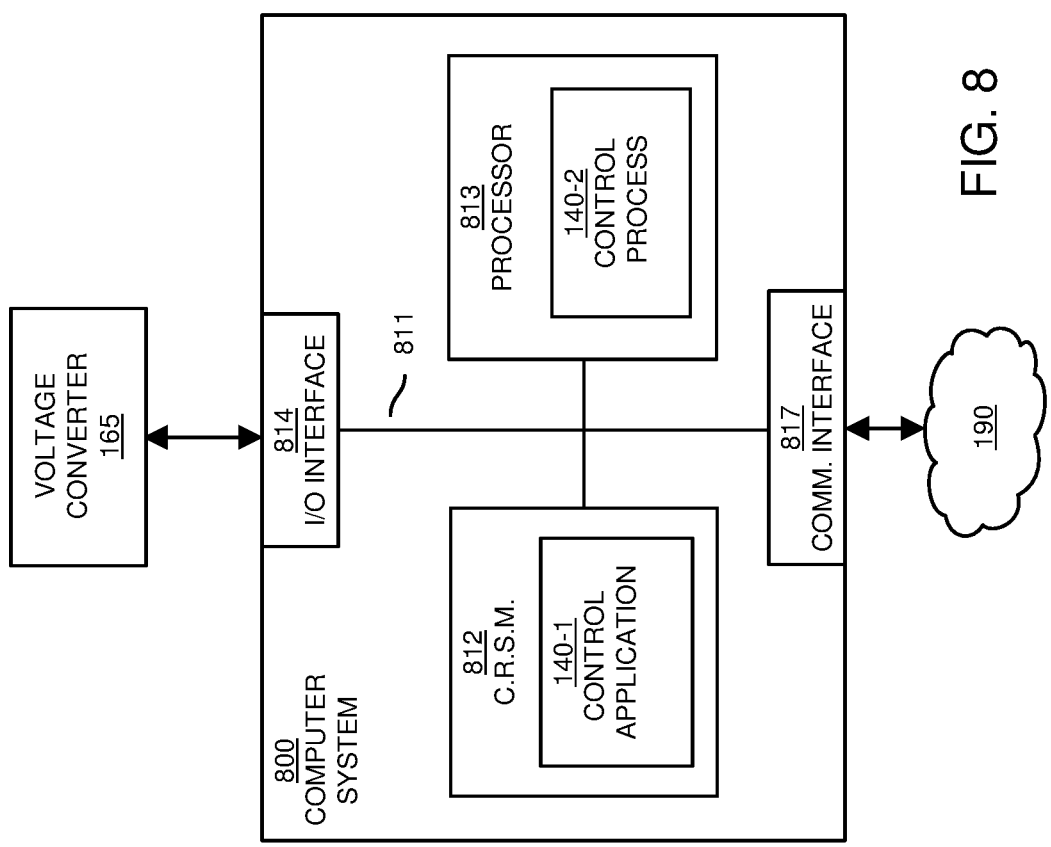
FIG. 8 is an example diagram illustrating computer processor hardware and related software instructions that execute methods according to embodiments herein.

FIG. 8 is an example block diagram of a computer device for implementing any of the operations as discussed herein according to embodiments herein.

As shown, computer system 800 (such as implemented by any of one or more resources such as controller 140, emulator 141, output current measurement resource 150, etc.) of the present example includes an interconnect 811 that couples computer readable storage media 812 such as a non-transitory type of media (or hardware storage media) in which digital information can be stored and retrieved, a processor 813 (e.g., computer processor hardware such as one or more processor devices), I/O interface 814, and a communications interface 817.

I/O interface 814 provides connectivity to any suitable circuitry such as power voltage converter 165.

Computer readable storage medium 812 can be any hardware storage resource or device such as memory, optical storage, hard drive, floppy disk, etc. In one embodiment, the computer readable storage medium 812 stores instructions and/or data used by the control application 140-1 (such as implementing controller 140, emulator 141, output current measurement resource 150, etc.) to perform any of the operations as described herein.

Further in this example embodiment, communications interface 817 enables the computer system 800 and processor 813 to communicate over a resource such as network 190 to retrieve information from remote sources and communicate with other computers.

As shown, computer readable storage media 812 is encoded with control application 140-1 (e.g., software, firmware, etc.) executed by processor 813. Control application 140-1 (such as emulator 141) can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 (such as emulator 141) in processor 813. In other words, the control process 140-2 associated with processor 813 represents one or more aspects of executing control application 140-1 within or upon the processor 813 in the computer system 800.

In accordance with different embodiments, note that computer system 800 can be a micro-controller device, logic, hardware processor, hybrid analog/digital circuitry, etc., configured to control a power supply and perform any of the operations as described herein.

Functionality supported by the different resources will now be discussed via flowchart in FIG. 9. Note that the steps in the flowcharts below can be executed in any suitable order.

Figure 9:
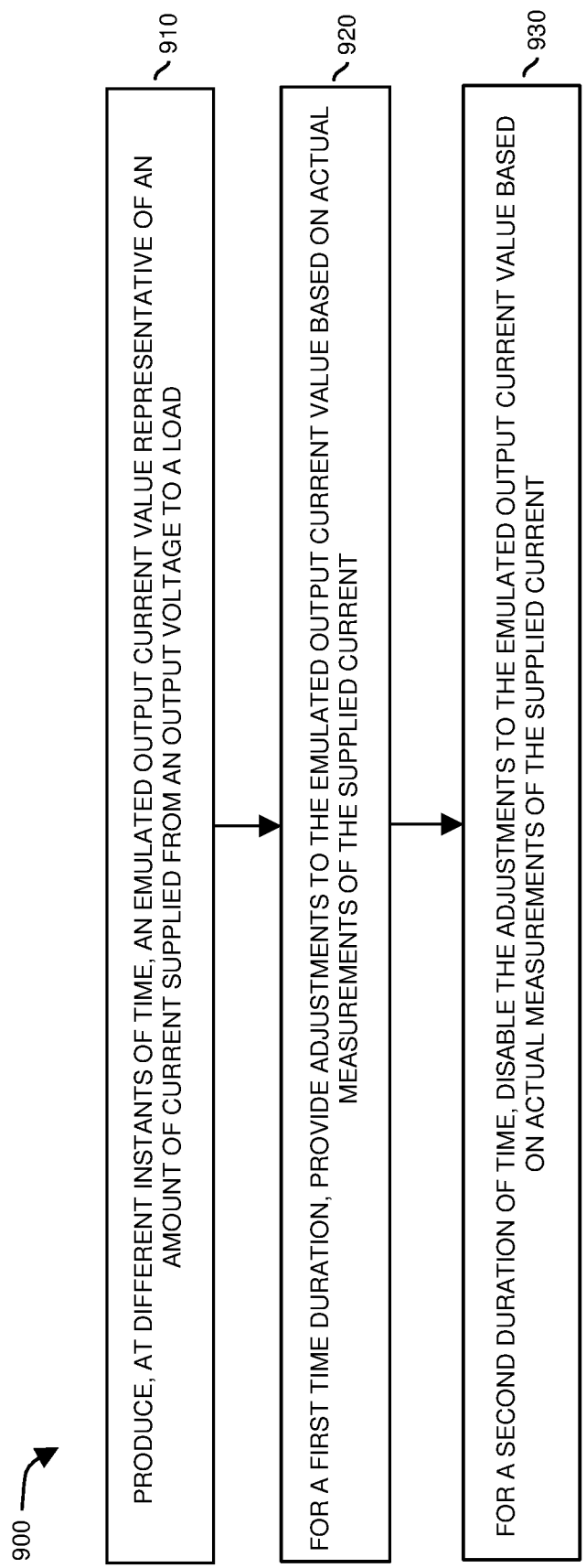
FIG. 9 is an example diagram illustrating a method according to embodiments herein.

FIG. 9 is an example diagram illustrating a method of controlling a power converter according to embodiments herein.

In processing operation 910, the emulator 141 receives a reference output current value (such as value M associated with output current information 155) representing an amount of output current delivered by a power converter 135 to a load 118.

In processing operation 920, the emulator 141 derives an average output current value (such as emulated output current value 125, output current value 125-1) based on the reference output current value M and an estimated average output current I'. As previously discussed, the derived average output current value 125 represents an average output current delivered to the load for a power delivery cycle.

In processing operation 930, the controller 140 controls operation of the power converter 135 based on the derived average output current value (emulated output current value 125).

Figure 10:
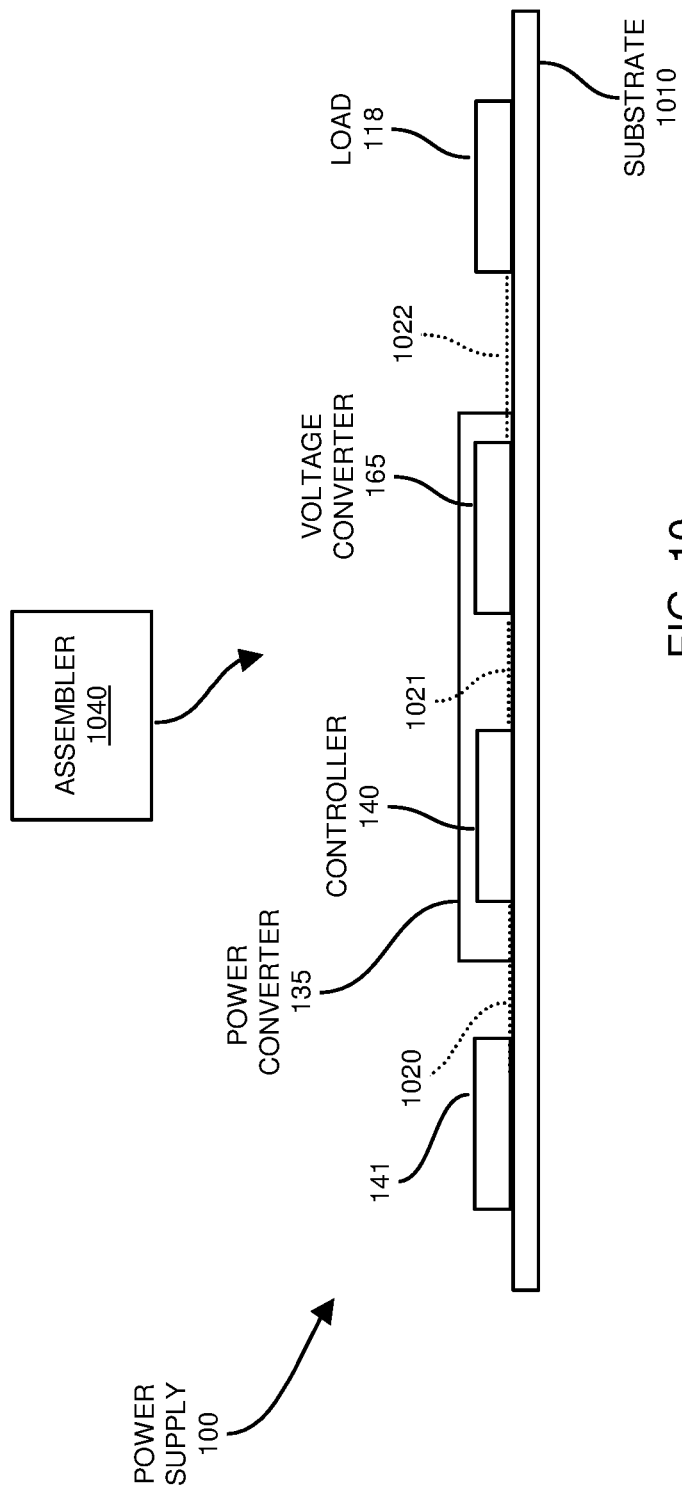
FIG. 10 is an example diagram illustrating assembly of a circuit/system according to embodiments herein.

FIG. 10 is an example diagram illustrating assembly of a power converter circuit on a circuit board according to embodiments herein.

In this example embodiment, assembler 1040 receives a substrate 1010 (such as a circuit board or other suitable resource). The substrate 1010 can be rigid, flexible, etc.

The assembler 1040 further affixes (couples) the emulator 141 and any associated circuit to the substrate 1010.

The assembler 1040 further affixes (couples) the controller 140 and voltage converter 165 (and corresponding components such as emulator 141, output current measurement resource 150, etc., associated with the power converter 135) to the substrate 1010.

Circuit paths 1020 couple the emulator 141 (such as one or more traces, electrical conductors, cables, wires, etc.) to the power converter 135. Via circuit paths 1021 (such as one or more traces, electrical conductors, cables, wires, etc.), the assembler 1040 couples the controller 140 to the voltage converter 165.

Note that components such as the controller 140, voltage converter 165, and corresponding components such as emulator 141, output current measurement resource 150, etc., associated with the power converter 135 can be affixed or coupled to the substrate 1010 in any suitable manner. For example, one or more of the components in power supply 100 can be soldered to the substrate, inserted into sockets on the substrate 1010, etc.

Note further that the substrate 1010 is optional. Circuit paths 1020, 1021, 1022, etc., may be disposed in cables providing connectivity between components in the substrate 1010.

In one nonlimiting example embodiment, the load 118 is disposed on its own substrate independent of substrate 1010; the substrate of the load 118 is directly or indirectly connected to the substrate 1010. The controller 140 or any portion of the power converter 135, any portion of the emulator 141, output current measurement resource 150, etc., can be disposed on a standalone smaller board plugged into a socket of the substrate 1010.

Via one or more circuit paths 1022 (such as one or more traces, cables, connectors, wires, conductors, electrically conductive paths, etc.), the assembler 1040 couples the voltage converter 165 to the load 118. In one embodiment, the circuit path 1022 conveys the output voltage 123 generated from the voltage converter 165 to the load 118.

Accordingly, embodiments herein include a system comprising: a substrate 1010 (such as a circuit board, standalone board, mother board, standalone board destined to be coupled to a mother board, host, etc.); an emulator 141, power converter 135, etc., including corresponding components as described herein; and a load 118. As previously discussed, the load 118 is powered based on conveyance of output voltage 123 and corresponding current 122 conveyed over one or more circuit paths 1022 from the voltage converter 165 to the load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
receiving a reference output current value representing an amount of output current outputted by a voltage converter to power a load;
iteratively deriving an average output current value based on samples of the reference output current value and an estimated average output current, the iteratively derived average output current value representing an average output current delivered to the load;
controlling the voltage converter based on the iteratively derived average output current value; and
wherein iteratively deriving the average output current value includes: determining an accuracy of the estimated average output current based on a generated remainder value stored in a buffer for each of multiple power delivery cycles associated with the voltage converter producing the output current.

2. The method as in claim 1, wherein the reference output current value represents a measured average amount of output current delivered by the voltage converter to the load during a less-than-all portion of a power delivery cycle of controlling the voltage converter to produce the output current.

3. The method as in claim 2, wherein the less-than-all portion of the power delivery cycle is a first portion of the power delivery cycle during which high side switch circuitry and low side switch circuitry in the voltage converter are activated at different times to produce the output current; and
wherein the power delivery cycle includes a second portion during which the high side switch circuitry and the low side switch circuitry of the voltage converter are deactivated.

4. The method as in claim 1 further comprising:
iteratively deriving the average output current value from the reference output current based on a trial and error of estimating the average output current.

5. The method as in claim 1, wherein iteratively deriving the average output current value includes:
repeatedly adjusting the estimated average output current over each of the multiple power delivery cycles.

6. The method as in claim 5 further comprising:
determining the accuracy of the adjusted estimated average output current over each of the multiple power delivery cycles based on a magnitude of the generated remainder value.

7. The method as in claim 1, wherein iteratively deriving the average output current value includes repeatedly adjusting a count value stored in the buffer for a respective power delivery cycle.

8. The method as in claim 7, wherein adjusting the count value in the buffer includes:

incrementing the count value stored in the buffer for each of multiple sample times during a first portion of the power delivery cycle during which a switch in the voltage converter is activated to generate the output current delivered to the load; and decrementing the count value in the buffer for a second portion of the power delivery cycle during which the switch in the voltage converter is deactivated.

9. The method as in claim 8, wherein a rate of incrementing the count value during the first portion of the power delivery cycle is different than a rate of decrementing the count value during the second portion of the power delivery cycle.

10. The method as in claim 1, wherein iteratively deriving the average output current value based on the reference output current value includes:

estimating the average output current value over a power delivery cycle of the voltage converter delivering the output current based on the reference output current value;

determining the accuracy of the estimated average output current; and applying an adjustment to the estimated average output current in response to detecting that an error associated with the estimated average output current is greater than a threshold error value.

11. An apparatus comprising:

an emulator operative to:

i) receive a reference output current value representing an amount of output current outputted by a voltage converter to power a load, ii) iteratively derive an average output current value based on samples of the reference output current value and an estimated average output current, the iteratively derived average output current value representing an average output current delivered to the load, and iii) determine an accuracy of the estimated average output current based on a generated remainder value stored in a buffer for each of multiple power delivery cycles associated with the voltage converter producing the output current; and a controller operative to control the voltage converter based on the iteratively derived average output current value.

12. The apparatus as in claim 11, wherein the reference output current value represents an average amount of output current delivered by the voltage converter to the load during a less-than-all portion of a power delivery cycle.

13. The apparatus as in claim 12, wherein the less-than-all portion of the power delivery cycle is a first portion of the power delivery cycle during which high side switch circuitry and low side switch circuitry in the voltage converter are activated to produce the output current; and wherein the power delivery cycle includes a second portion during which the high side switch circuitry and the low side switch circuitry of the voltage converter are deactivated.

14. The apparatus as in claim 11, wherein the emulator is further operative to:

iteratively derive the average output current value from the reference output current based on trial and error of estimating the average output current for a respective power delivery cycle.

15. The apparatus as in claim 11, wherein the emulator is further operative to:

repeatedly adjust the estimated average output current over each of multiple power delivery cycles until a magnitude of an error associated with the estimated average output current is below a threshold value.

16. The apparatus as in claim 11, wherein the emulator is further operative to:

adjust a count value stored in the buffer during a power delivery cycle in which the voltage converter produces the output current.

17. The apparatus as in claim 16, wherein the emulator is further operative to:

increment the count value stored in the buffer for each of multiple sample times during a first portion of the power delivery cycle during which the voltage converter generates the output current delivered to the load; and decrement the count value in the buffer for a second portion of the power delivery cycle.

18. The apparatus as in claim 17, wherein a rate of incrementing during the first portion of the power delivery cycle is different than a rate of decrementing during the second portion of the power delivery cycle.

19. The apparatus as in claim 11, wherein the emulator is further operative to:

estimate the average output current value over a power delivery cycle of the voltage converter delivering the output current based on the reference output current value;

determine the accuracy of the estimated average output current; and apply an adjustment to the estimated average output current in response to detecting that an error associated with the estimated average output current is greater than a threshold error value.

20. Computer-readable storage media having instructions stored thereon, the instructions, when executed by computer processor hardware, cause the computer processor hardware to:

receive a reference output current value representing an amount of output current outputted by a voltage converter to power a load;

iteratively derive an average output current value based on samples of the reference output current value and an estimated average output current, the average output current value representing an average output current delivered to the load;

determine an accuracy of the estimated average output current based on a generated remainder value stored in a buffer for each of multiple power delivery cycles associated with the voltage converter producing the output current; and control the voltage converter based on the iteratively derived average output current value.

21. A system comprising:

a circuit substrate;

the apparatus of claim 11, the apparatus affixed to the circuit substrate; and wherein the load is coupled to the substrate.

22. A method comprising:

receiving a circuit substrate; and coupling the apparatus of claim 11 to the circuit substrate.

23. The system as in claim 11, wherein the emulator is operative to generate the estimated average output current based on settings of control signals applied to the voltage converter to produce the output current.

24. The system as in claim 23, wherein the emulator is operative to implement a counter function to determine the estimated average output current, operation of the counter function controlled depending on the settings of the control signals.

25. The system as in claim 24, wherein the settings of the control signals control multiple switches in the voltage converter to produce the output current;
   wherein the emulator is operable to: monotonically increase a magnitude of a count value of the counter function during a first condition in which any of the multiple switches are activated to an ON-state as controlled by the control signals during a respective control cycle of producing the output current; and
   wherein the emulator is operable to: monotonically decrease a magnitude of the count value of the counter function during a condition in which each of the multiple switches are deactivated to an OFF-state as controlled by the control signals during the respective control cycle of producing the output current.

26. The system as in claim 25, wherein the emulator is further operative to compare a magnitude of the count value generated for the respective control cycle to a reference value to determine the accuracy of the estimated average output current for the respective control cycle.

27. The system as in claim 11, wherein the emulator includes a counter operative to generate the estimated average output current, the emulator operative to use a count value of the counter at an end of a respective control cycle to determine the accuracy of the estimated average output current for the respective control cycle, the count value of the counter at the end of the respective control cycle being the generated remainder value.

28. The system as in claim 27, wherein the emulator is operative to control operation of the counter and a magnitude of the count value generated by the counter based on control signals applied by the controller to the voltage converter to produce the output current.

29. The system as in claim 1, wherein the emulator is operative to:
   adjust a magnitude of the estimated average output current for a next control cycle with respect to a prior control cycle based on a respective sample of the estimated average output current and the reference output current value generated for the prior control cycle.

30. The system as in claim 11, wherein the emulator is operative to adjust the estimated average output current for each of multiple control cycles of controlling the voltage converter based on a determined error of the estimated average output current with respect to a threshold, the estimated average output current adjusted such that the estimated average output current accurately tracks a magnitude of the output current outputted from the voltage converter to power the load.

31. The system as in claim 30, wherein the determined error is based at least in part on a time duration of a respective control cycle in which the accuracy of the estimated average output current is being verified.

* * * * *